Jan. 31, 1961

C. EAMES 2,969,831

SIDE FLEXING SHOCK MOUNT

Filed July 28, 1958

INVENTOR.
CHARLES EAMES
BY
*Price and Heneveld*
ATTORNEYS

INVENTOR.
CHARLES EAMES
BY
ATTORNEYS

United States Patent Office 2,969,831
Patented Jan. 31, 1961

2,969,831

SIDE FLEXING SHOCK MOUNT

Charles Eames, Venice, Calif., assignor to Herman Miller, Inc., a corporation of Michigan Filed July 28, 1958, Ser. No. 752,156

1 Claim. (Cl. 155—191)

This invention relates to a shock mount particularly useful for securing two parts of furniture together while still permitting a certain amount of give or twist between the two parts. More specifically this invention relates to furniture construction having two overlapping parts secured together by a novel side flexing shock mount.

This application is a continuation-in-part of patent application Serial No. 646,605, filed March 18, 1957 and entitled Side Flexing Shock Mount, now abandoned.

In the development and designing of furniture one prevailing problem is the means for securing parts of the furniture together particularly when the parts are made of thin material such as plywood or metal. This problem is particularly difficult when a certain amount of twisting or give between the parts is desired so as to provide resiliency to one of the parts. In general, efforts to solve this problem have failed. One attempt was to use the funiture shock mounts of my Patent Number 2,649,136. This type of a shock mount has proven very successful for securing two parts together when the shock mount is required to absorb only vibration and compression shock. However, when a twisting movement between the two parts is desired the round button type shock mount was unsuccessful even when two of the buttons were arranged next to each other. Tests have proven that after numerous twisting or deflection cycles one of the two button type shock mounts is ruptured. Numerous attempts have been made to devise a practical arrangement for securing the two parts together in such a fashion that the twisting or give between the two parts is provided.

I have solved the problem by devising the shock structure of this invention. Therefore, the object of this invention is to provide a shock mount capable of securing two parts of furniture together while still permitting twisting movement between the two parts.

Still another object of this invention is to provide a shock mount that is simple in construction but durable and strong for securing two parts together in a fashion to provide a certain amount of give or twist between the two parts.

A further object of this invention is to provide a shock mount construction which overcomes disadvantages inherent in mounting assemblies heretofore known in the art.

Other objects of my invention will become obvious upon reading the following specification in conjunction with the accompanying drawings wherein.

Briefly this invention relates to a shock mount for securing two parts of furniture together while still permitting a certain amount of give or twist between the parts. This shock mount comprises an elongated block of resilient material having an elongated rigid member or insert secured thereto. The insert has securement means located approximate each end. This securement means is preferably a threaded opening adapted to receive a bolt.

The shock mount is adhesively secured to one furniture part and the other part has apertures for receiving the bolts that removably secure the other part to the shock mount. The bolts are threadedly secured to the rigid insert thus securely mounting the other furniture part to the insert. The resilient block supports the rigid insert whereby the parts are resiliently secured to each other.

Figure 1:
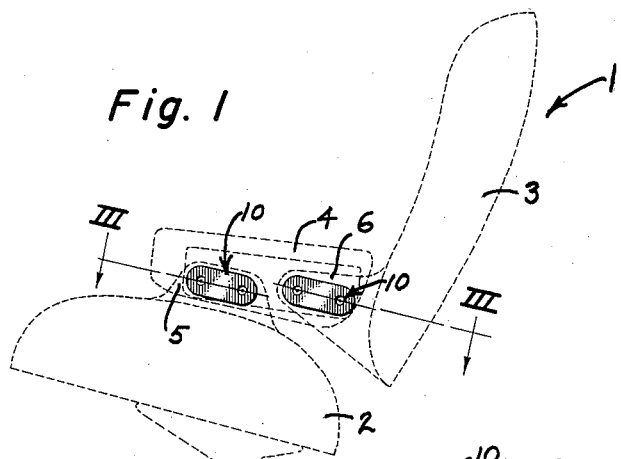
Fig. 1 is a side elevational view of a chair (shown in phantom) in which is incorporated the shock mounts of this invention.

Referring to the drawings, Fig. 1 shows a chair denoted by the reference numeral 1. The chair has three main parts, the seat 2, the back 3, and the arm rest 4. The seat 2 has an upstanding portion 5 and the back rest 3 has a forwardly extending portion 6. The arm 4 overlaps both of the portions 5 and 6 and is secured thereto by the shock mounts 10.

Shock mount 10 is adhesively secured to the upstanding portion 5 of the seat 2 by any suitable adhesive. The arm rest 4 is secured to the shock mount and thus to the seat 5 by means of bolts 7 extending through the openings 8 of the arm rest.

The shock mount 10 provides the only joining connection between the seat 2 and the back rest 3. Thus, when a person reclines against the back of the chair, the back has a certain degree of resiliency due to the twisting of the resilient shock mount.

Each of the shock mounts 10 is constructed of a body 11 of resilient material in which is embedded the rigid member or insert 12. The shock mount is fabricated by moulding the resilient material around the insert. It is important that the body 11 and insert 12 both be elongated to provide adequate support and sufficient resiliency.

The elongated body 11 is constructed of natural rubber or a synthetic rubber such as neoprene. The durometer measured in Shore hardness is from 55 to 75 providing sufficient resiliency to the shock mount but still being sufficiently rigid to withstand the loads.

The rigid insert 12 is preferably constructed of steel. I fabricated it from a piece of hot rolled steel which is pierced at the opening 13 and then properly tapped for receiving the threaded bolt 7. No. 12 gauge hot rolled steel is a satisfactory material for the steel insert 12.

It is important that steel insert 12 be spaced a sufficient distance from the surface which is bonded to seat part 5, so that the body 11 will twist when force is applied to the insert 12. Otherwise, loads exerted on insert 12 will be directly transmitted to the furniture part 5 causing the shock mount to rip off or shear the surface of part 5.

In the operation of this mounting block, deviating loads exerted on the furniture parts produce a torsional load about a center point located on the medial plane of the shock mount midway between the two openings 13. The load is evenly distributed by the rigid insert which carries the major portion of the load. The rubber body 11 having the proper resiliency is capable of being twisted so as to absorb all loads and shocks.

This shock mount or block is sufficiently flexible to give desired flexibility to the back of the chair while at the same time providing durability and strength due to the even distribution of the load. The elongation to load ratio is also consistent because of this even load distribution.

Figure 2:
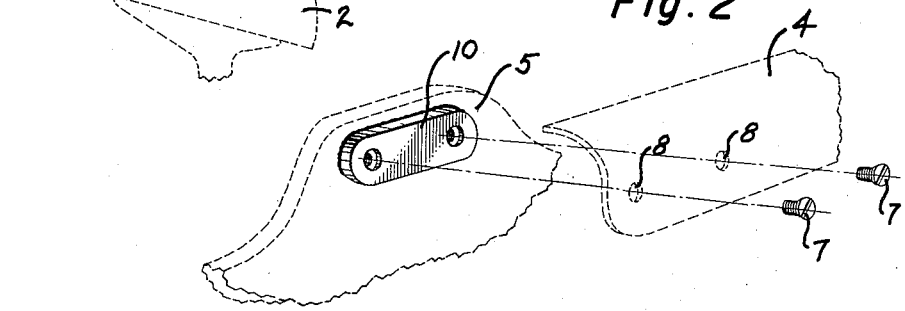
Fig. 2 is a partial, exploded view of two parts of the chair illustrating the arrangement of the shock mount.
Figure 3:
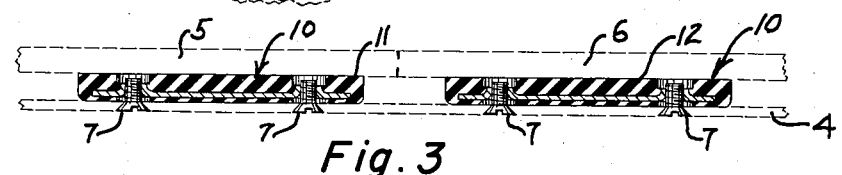
Fig. 3 is a sectional view taken around the plane III—III of Fig. 1.
Figure 4:
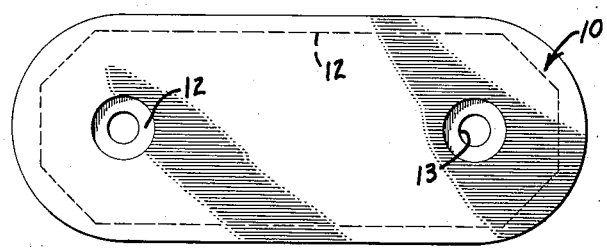
Fig. 4 is a plan view of one of the shock mounts.
Figure 5:
Fig. 5 is a sectional view taken along the medial plane of the shock mount.
Figure 6:
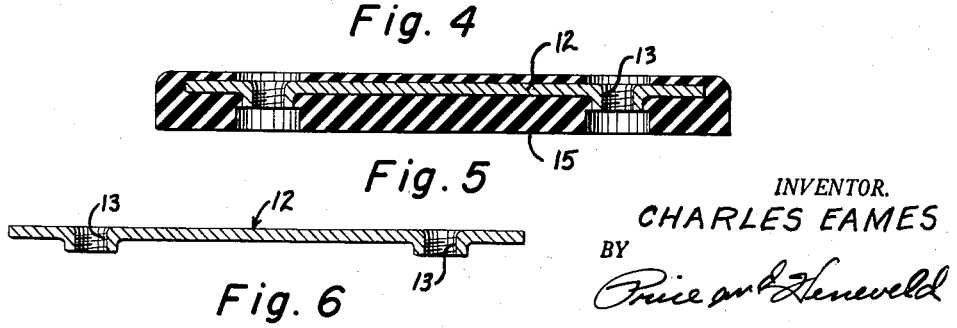
Fig. 6 is a sectional view taken along the medial plane of the shock mount insert.

Figs. 7, 8, 9 and 10 illustrate the comparison between this invention and other possible shock mount arrangements. Each of these shock mounts were constructed of a metal plate embedded in a body of rubber or neoprene. The shapes of the plate and rubber body are illustrated by the inset in the graph. The various constructions were tested by a J. Scott Tester. The test consisted of adhesively securing one side of the rubber button to a rigid piece of wood and an elongated arm to the other side of the button constructions by screws secured to the embedded plate, this attachment means being like that shown by Fig. 2. The distance between the points of screw attachment were equal in each test as denoted by the distance D. The arm extended beyond one of the screw attachments a distance E at which point varying loads were applied until failure, the deflection being measured for each load.

Figure 7:
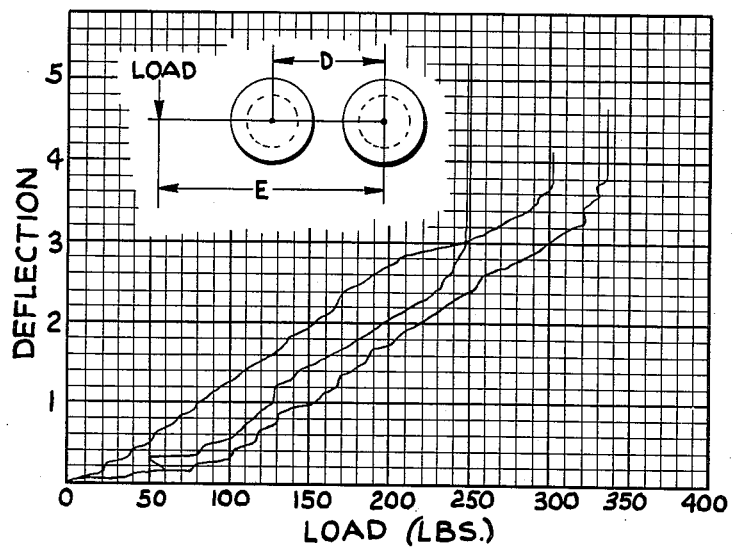
Figs. 7, 8, 9 and 10 are graphs of the deflection versus load ratio obtained in testing various shape shock mounts. These graphs illustrate the new result and superiority of the subject invention.
Figure 8:
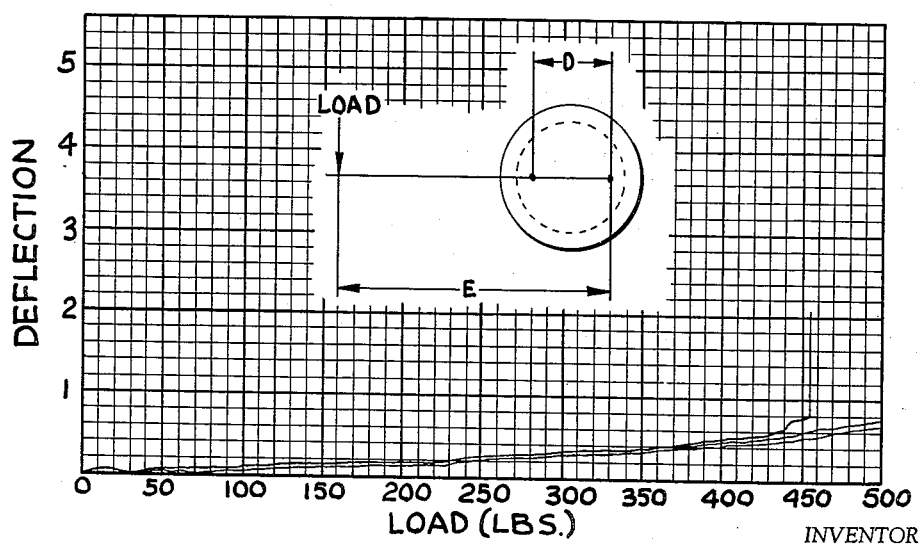
Figure 9:
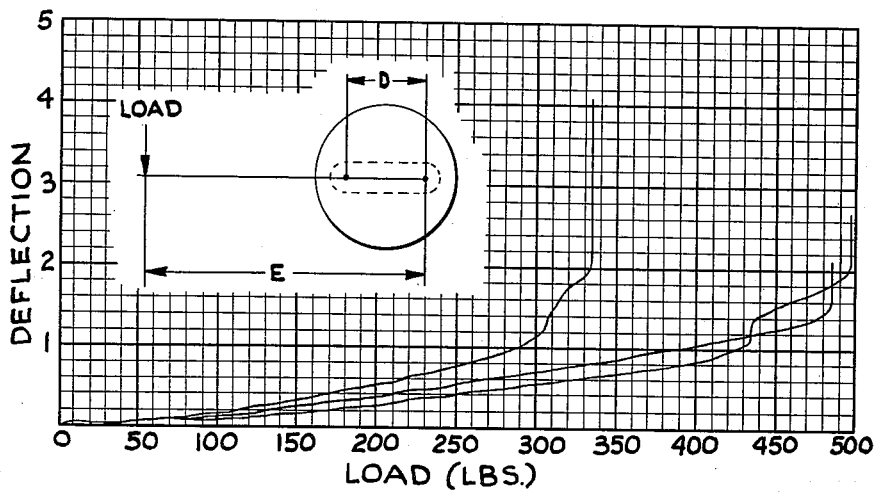
Figure 10:
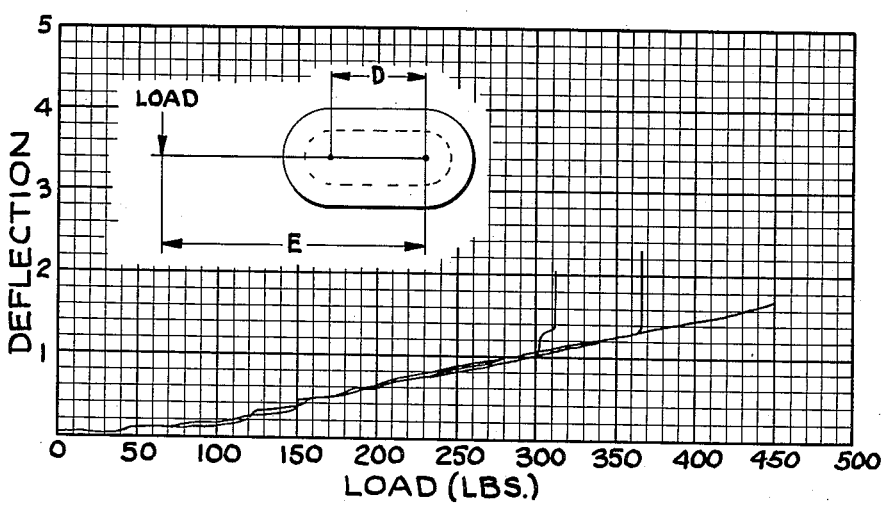

Fig. 7 is a graph showing the results of the tests performed on the two button arrangements illustrated by the inset. Fig. 8 is a similar type graph of a shock mount having a circular rubber body and plate. Fig. 9 is a graph showing the test results of a shock mount having a circular body and an elongated plate. Fig. 10 illustrates the test results of the present invention.

It will be noted that the three tests of the shock mount of Figs. 7 and 9 are not consistent. As a result these forms are not dependable and, therefore, not adaptable for the purpose of providing a desired twisting or deflection characteristic between two parts as required in furniture of the type described. The form of Fig. 9, as evidenced by the graphs, is not sufficiently flexible and not as strong and durable as the present invention. It also occupies a greater area. The Fig. 7 form is flexible (probably too much for the purpose described,) but does not have sufficient strength. It is believed this lack of strength and consistency in these forms of Figs. 7 and 9 is due to the uneven distribution of the loads.

The shock mount of Fig. 8 has consistent deflection to load ratio but the total deflection is not sufficient. Further, the area occupied by this circular shock mount is too great. I have discovered the form of the present invention produces the desired flexibility for most purposes, such flexibility and strength being consistent. The strength exceeds that of Figs. 7 and 9 and closely approaches that of Fig. 8 which does not have the desired flexibility and also has a distinct disadvantage of occupying too much space. As a whole the shock mount of this invention is far superior to the other shock mount arrangements for both deflection-load ratio and consistency or dependability.

Having described my invention, it should become obvious that although I have described a preferred embodiment, alterations and modifications are possible within the broadest aspect. Therefore, all alterations and modifications are covered by this invention unless the appended claim by its language expressly states otherwise.

I claim:

A furniture construction comprising: two overlapping parts; a side flexing shock mount adhesively secured to one of said parts; said shock mount comprising an elongated block of resilient material; an elongated rigid member embedded in said block; said member having fastening means associated therewith proximate to the ends thereof for fastening the other of said parts thereto; said block having apertures aligned with said fastening means permitting passage of said fastening means through one face of said block; said other part being attached to said fastening means.

References Cited in the file of this patent

UNITED STATES PATENTS

| 1,957,694 | Chamberlain et al. | May 8, 1934 |
| 2,460,596 | Roche | Feb. 1, 1949 |
| 2,667,210 | Eames | Jan. 26, 1954 |
| 2,676,774 | Hirst | Apr. 27, 1954 |
| 2,715,510 | Fillion | Aug. 16, 1955 |

FOREIGN PATENTS

| 666,908 | Great Britain | Feb. 20, 1952 |